US012804046B2

(12) United States Patent
Woodworth et al.

(10) Patent No.: US 12,804,046 B2
(45) **Date of Patent: *Nov. 17, 2026**

(54) SYSTEM AND METHOD FOR TRANSFERRING A CLIENT CONNECTION

(71) Applicant: CenturyLink Intellectual Property LLC, Denver, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 41 days.

This patent is subject to a terminal disclaimer.

(21) Appl. No.: 19/028,106

(22) Filed: Jan. 17, 2025

(65) Prior Publication Data

US 2025/0168242 A1 May 22, 2025

Related U.S. Application Data

(63) Continuation of application No. 17/936,134, filed on Sep. 28, 2022, now Pat. No. 12,206,740.

(60) Provisional application No. 63/294,437, filed on Dec. 29, 2021.

(51) Int. Cl.

| | |
|---|---|
| ***H04L 67/148*** | (2022.01) |
| ***H04L 9/40*** | (2022.01) |
| ***H04L 61/5007*** | (2022.01) |
| ***H04L 67/141*** | (2022.01) |

(52) U.S. Cl.
CPC ........ *H04L 67/148* (2013.01); *H04L 61/5007* (2022.05); *H04L 63/0428* (2013.01); *H04L 67/141* (2013.01)

(58) Field of Classification Search
CPC ............... H04L 67/148; H04L 61/5007; H04L 63/0428; H04L 67/141; H04L 61/103; H04L 61/5061; H04L 2101/622; H04L 69/40
See application file for complete search history.

(56) References Cited

U.S. PATENT DOCUMENTS

| | | | |
|---|---|---|---|
| 9,648,528 B2 | 5/2017 | Lee | |
| 2003/0086390 A1 | 5/2003 | Eschback | |
| 2005/0265263 A1 | 12/2005 | Wajda | |
| 2005/0273592 A1 | 12/2005 | Pryor | |
| 2007/0288754 A1* | 12/2007 | Kaji | H04L 63/0428 713/175 |
| 2009/0037998 A1 | 2/2009 | Adhya | |
| 2009/0063697 A1* | 3/2009 | Fukao | H04L 67/56 709/232 |
| 2010/0138531 A1 | 6/2010 | Kashyap | |
| 2011/0212783 A1 | 9/2011 | Dale | |
| 2011/0219105 A1 | 9/2011 | Kryze | |

(Continued)

*Primary Examiner* — Benjamin M Thieu

(57) ABSTRACT

In a system with a plurality of servers serving one or more clients, situations may arise in which a client has a connection to a first server which is providing a service to the client, and in which it would be advantageous to transfer the connection to a second server, in a manner that does not require the re-establishing of the connection or the making of a renewed request, by the client, for the service. As such, a system and method for transferring a client connection from one server to another server are provided.

16 Claims, 14 Drawing Sheets

(56) References Cited

U.S. PATENT DOCUMENTS

| | | | | |
|---|---|---|---|---|
| 2016/0065543 | A1 * | 3/2016 | Muranaka | H04L 63/06 713/168 |
| 2023/0208923 | A1 | 6/2023 | Woodworth | |

* cited by examiner

SYSTEM AND METHOD FOR TRANSFERRING A CLIENT CONNECTION

FIELD

One or more aspects of embodiments according to the present disclosure relate to interactions between servers and clients, and more particularly to a system and method for transferring a client connection from one server to another server.

BACKGROUND

In a system with a plurality of servers serving one or more clients, situations may arise in which a client has a connection to a first server that is providing a service to the client. In examples, it may become necessary or advisable to transfer the connection to a second server.

It is with respect to this general technical environment that aspects of the present disclosure are related.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A system and method for transferring a connection to a client between servers are provided. In an aspect, a method is provided, according to which, a connection between a first server and a client is established, wherein the client communicates with the first server at a first Internet protocol (IP) address. The first server subsequently sends state information to allow a second server to assume the connection; and the connection is thereafter transferred from the first server to the second server, including moving the first IP address from the first server to the second server.

In another aspect, a system is provided comprising at least one processor and memory, operatively connected to the at least one processor and storing instructions that, when executed by the at least one processor, cause the system to perform a method. In examples, the method may comprise: establishing a connection between a first server and a client, wherein the client communicates with the first server at a first Internet protocol (IP) address; sending, by the first server, state information to allow a second server to assume the connection; and transferring the connection, from the first server to the second server, including moving the first IP address from the first server to the second server.

In another aspect, a system is provided comprising at least one processor and memory, operatively connected to the at least one processor and storing instructions that, when executed by the at least one processor, cause the system to perform a method. In examples, the method may comprise: receiving, from a first server and at a second server, first state information relating to a connection between the first server and a client; receiving, from the first server and at the second server, an update to the first state information, the update including state information changes having occurred after receiving the first state information and indicative of a computing process being performed by the first server for the client; receiving, at the second server and after receiving the update to the first state information, an indication that the connection needs to be transferred; receiving, by the second server, an indication that a first internet protocol (IP) address related to the connection has been transferred from the first server to the second server; and continuing, by the second server and based on the update to the first state information, the computing process via the connection to the client.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for transferring a client connection from one server to another server provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
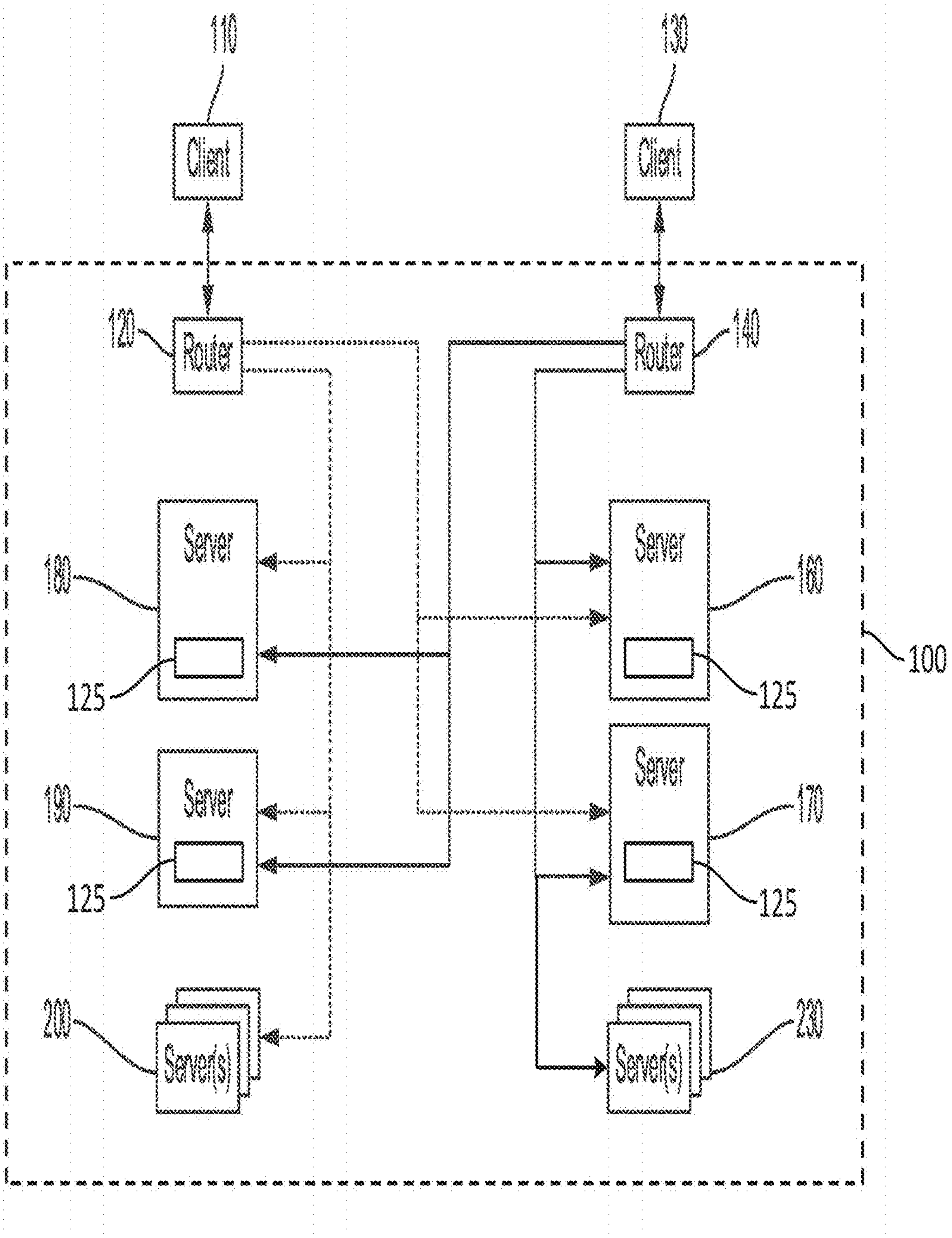
FIG. 1 is a block diagram of a server cluster and two clients, according to an embodiment of the present disclosure.

FIG. 1 shows a server cluster 100, in some embodiments. A first router 120 is connected to a first server 180, a second server 190, and a first plurality of additional servers 200, and a second router 120 is connected to a third server 160, a fourth server 170, and a second plurality of additional servers 230. The first router 140 may be connected to a first client 110, and the second router 140 may be connected to a second client 130. The first router 120 may also be connected to the third server 160 and the fourth server 170 and the second router 140 may also be connected to the first server 180 and the second server 190, as shown. In some examples, one or more of the servers 180, 190, 220, 230 may comprise a separate physical server computing device. In other examples, one or more of the servers 180, 190, 220, 230 may comprise a virtual machine. In examples, multiple virtual machines (virtual servers) may operate on a single physical computing device. Exemplary virtual machines may each comprise a partitioned environment on a physical computing device, including functionality necessary to execute an operating system.

In operation, the server cluster 100 may provide various services to each client 110, 130. For example, the servers may store a plurality of files any of which may be sent to a client upon request. Each server may also be able to access a database (e.g., a centralized database, on a database server accessible to all of the servers), and, upon request from a client, a server may submit a query to such a database server, and the database server may execute the query, and (i) return the query response to the server, or (ii) store the query response, for retrieval by the server (e.g., a portion at a time). The server may forward the response to the client, or it may perform further processing of the query response, and send the results of the processing to the client. A cluster agent (or "cluster resource management agent") 125 may be run on each of the servers. Although in FIG. 1, the cluster agent 125 is explicitly shown only on four of the servers for ease of illustration; in some embodiments the cluster agent 125 runs on each of the servers. In examples where cluster agent 125 operates on multiple servers, the different instances of cluster agent 125 may cooperate to periodically share information to keep each instance in synch with the others.

In operation, each server may at any time be connected to zero or more clients, e.g., via respective Transmission Control Protocol (TCP) connections. The load on each server may fluctuation with time, depending on the number of clients to which it is connected and the demands each client is making on the server. The quality of service to a client may degrade if it is being served by a server with a heavy workload. As such, load balancing may be employed to arrange for the workload of the server cluster to be relatively evenly distributed among the servers. Load balancing may involve the transfer of tasks from one server to another. For example, a server with a heavy workload that is in the process of serving a file to a client may transfer the task of serving the file to another server, which may take over the task of serving the file, and send, to the client, the remainder of the file. Decisions about which tasks to transfer, and which servers to transfer any such tasks to, may be made by the individual servers (e.g., by any server with a heavy workload), or by the cluster agent 125. The cluster agent 125 may also make decisions about other resources such as CPU and memory.

In some embodiments, before a task is transferred from one server (which may be referred to as the "losing" server) to another server (which may be referred to as the "gaining" server), the losing server may transfer, to the gaining server, state information (which may be part of a bundle referred to as a "network-state bundle" (discussed in further detail below)) sufficient to allow the gaining server to assume the connection to the client (and to assume the associated task), without the participation of the client in the transfer of the connection. In the following, various examples are described in which the losing server (or the potential losing server, when the system is preparing for the possibility of a transfer of a connection) is the first server 180 in FIG. 1, the gaining server is the second server 190, and the client is the first client 110. In other situations, other servers of the cluster may be the losing server and gaining server, and the client may be another client, e.g., the second client 130. The transfer may be performed in such a manner that, after the transfer, the gaining server 190 receives packets from the client 110, and sends, to the client 110, the same packets as the losing server 180 would have sent had the transfer not taken place. As such, the transfer may be not be perceptible to the client 110 except possibly for changes in the times at which it receives packets (e.g., there may be additional delay while the transfer is performed, and, after the transfer is completed, there may be a reduction in delay if the gaining server 190 has a lower workload than the losing server 180 had).

As mentioned above, the state information transferred by the losing server 180 to the gaining server 190 may include sufficient information for the gaining server 190 to assume the connection with the client 110, so that it will not be necessary to terminate the connection and establish a new connection between the client 110 and the gaining server 190. As such, the state information may include the TCP state of the connection, including, e.g., a packet identifier (packet ID) for the most recently sent packet and a packet ID for the most recently received packet, socket information (e.g., client and server Internet Protocol (IP) addresses and ports), and a window size. As used herein, "transferring a connection" (that is initially a connection between a client and a first server (e.g., the losing server 180)) to a second server (e.g., the gaining server 190) means causing the second server to become connected to the client and to continue providing the service (provided, before the transfer, by the first server) to the client in a manner that does not require the connection to be terminated and re-established. Transferring a connection from a first server to a second server means also transferring to the second server any pending task that the client may expect to be completed and that the first server has not completed. In examples, as used herein, "transferring a task" from a first server to a second server means transferring the responsibility for the performing of the task from the first server to the second server, in a manner not requiring that the client make a new request for the performance of the task. As used herein, "assuming a connection," by a second server, from a first server, means assuming, by the second server, the responsibility for the connection, and any tasks associated with it, without breaking and re-establishing the connection.

If the connection to the client 110 is an encrypted connection (e.g., a connection employing Transport Layer Security (TLS)), then, to be sufficient to allow the gaining server 190 to assume the connection with the client 110, the state information may include sufficient information to allow the gaining server 190 to generate the same encrypted packets as the losing server 180 would have generated had the connection not been transferred. This state information may include active private encryption keys, for example. Moreover, because TLS uses the previously sent encrypted packet as an input for the encryption of the next packet (e.g., using cipher block chaining (CBC) or other similar methods), the state information may also include a copy of the previously sent encrypted packet. To avoid compromising the security of an encrypted connection to the client 110, the state information (e.g., private encryption keys) related to encryption may be encrypted before being sent from the losing server 180 to the gaining server 190, e.g., by being sent through an encrypted connection (e.g., over TLS, or using any other cryptographically safe encryption method). Other state information for which a high level of security is not needed (e.g., the TCP state information) may be sent by the losing server 180 to the gaining server 190 in clear form, or with moderate security precautions, e.g., with a signature or hash to authenticate the origin of the information.

The state information may further include sufficient information for the gaining server 190 to resume the task associated with the connection at the point to which the losing server 180 has completed the task. For example, if the losing server 180 has begun a file transfer to the client 110, the state information may include (i) a file identifier for a file stored in storage accessible to both the first server and the second server and (ii) a pointer into the file (e.g., a pointer to the first byte of the unsent portion of the file), identifying file data remaining to be sent. As another example, if, prior to the transfer, the losing server 180 sent a query (associated with the task and with the connection) to the database server and began processing the query response, the losing server 180 may send state information to the gaining server 190 that enables the gaining server 190 to take over the processing of the query response at the point at which the losing server 180 stopped processing. For example, if the query response is stored in the database server, the losing server 180 may send to the gaining server 190 (i) a response identifier (response ID), identifying the response in the database server and (ii) a cursor identifying the boundary, in the query response, between the portion of the query response that has been processed and the portion of the query response that has not been processed, so that the gaining server 190 may then resume processing the query response, at the cursor. As an alternative (e.g., if the query response was returned to the losing server 180 and not stored in the database server), the state information may include the query response.

As another example, if the losing server 180 has performed data processing (associated with the task and with the connection) and stored the results of the data processing locally (e.g., in memory or in persistent storage of the losing server 180), and if the processed data may affect future packets to be sent to the client 110, then the state information may also include a copy of the processed data, or, if the processed data are stored in a location to which the gaining server 190 has access (e.g., in shared persistent storage or in shared memory), the state information may include a pointer to the processed data. For example, if the client 110 requested statistical data based on the query response (e.g., the number of occurrences of a particular value in the query response), then the currently accumulated statistical data (e.g., the current count of the number of occurrences) may be stored in the memory of the losing server 180 and sent to the gaining server 190 as part of the state information, so that after the transfer the gaining server 190 may continue the analysis (e.g., it may continue counting, beginning at the current cursor location). As an alternative, instead of sending the processed data, or a pointer to the processed data, the losing server 180 may send to the gaining server 190 instructions for re-creating the processed data.

As part of the transfer of the connection from the losing server 180 to the gaining server 190, the Internet Protocol (IP) address that the losing server 180 was using for the connection to the client 110 may be moved from the losing server 180 to the gaining server 190. This may be accomplished in various ways, including through Virtual Router Redundancy Protocol (VRRP), Hot Standby Router Protocol (HSRP), or border gateway protocol (BGP), or using a proxy or load balancer, which may intercept all traffic to a particular IP address and send it to the losing or gaining server based on instructions or rules. In some embodiments the cluster agent 125 may maintain a pool of movable IP addresses, and allocate them to the servers of the server cluster 100 upon request, e.g., when a server initiates a new connection. In some embodiments, the use of BGP makes it possible to move IP addresses from one server to another even if the servers of the server cluster 100 are geographically dispersed, e.g., if the most direct connection between two of the servers is via two or more switches or routers. In some embodiments, an Address Resolution Protocol (ARP) is proxied to synthesize the moving of an IP address across switch boundaries (broadcast domains) and geographical regions.

In some embodiments, it may be advantageous to maintain several candidate gaining servers (or "backup servers") for any task that a server is performing, so that, for example, if a potential losing server's workload (i.e., the workload of a server (e.g., the first server 180) that may become a losing server) becomes high, it may select, from the backup servers, a server with relatively low workload as the recipient of any task to be transferred. This may also be advantageous if the server becomes inoperable (e.g., as a result of a software or hardware fault); in such a case (as discussed in further detail below) it may, under certain circumstances, be possible for another server to take over any task and the associated connection, resulting in better service to the client 110 than allowing the connection to fail and waiting for the client 110 to renew the request that triggered the performing of the task.

To the extent that transfers of connections and tasks to other servers may on occasion be made on short notice (e.g., if a server's load increases abruptly, or if a server becomes inoperable), it may be advantageous if the state information needed for the transfer of a connection and an associated task is periodically sent to one or more candidate gaining servers, so that the initiating of the transfer may involve little data transfer and may be completed quickly. Such periodic sending of the state information may involve resending a complete set of state information periodically (e.g., every five or ten seconds) or it may involve sending a complete set of state information only initially, or relatively rarely, and sending, more frequently, updates to the state information, the updates including only the state information that has changed since the last sending of the state information or of an update. In some embodiments, to make possible the transfer of a plurality of (e.g., of all of) the connections and tasks of a server, the server may periodically send a "bundle" of sets of state information (or state information updates), each set in the bundle corresponding to a different connection and task.

If, when a server (e.g., the first server 180) becomes inoperable, a significant amount of time has elapsed since the last sending of state information from the server, it may be difficult for the gaining server (e.g., the second server 190) to assume the connection. As such, in preparing for a possible server failure, a balance may be struck between (i) sending state information sufficiently frequently that transfer of the connection is likely to be possible regardless of when a server fails and (ii) avoiding a heavy load on the system as a result of the frequent sending of state information. This balance may, be arbitrated, for example by the cluster agent 125. For example, in an application in which reliable service to the client 110 is critical, the cluster agent 125 may set the frequency of updates of state information to be high, even if the performing of such frequent updates imposes a significant burden on the system.

When a plurality of candidate gaining servers is to be made available, multicast may be used to reduce the traffic needed to maintain, at each candidate gaining server, sufficient state information to assume the connection, and take over a task, from a potential losing server 180. In such an embodiment, the potential losing server 180 may periodically send the state information (or an update to the state information) to a designated multicast IP address. Each candidate gaining server may receive multicasts through a selective multicast listener, which may (i) receive and process multicast packets including state information related to connections and tasks for which the server is a candidate gaining server (e.g., including packets from the potential losing server 180), and (ii) discard packets including state information for connections and tasks for which the server is not a backup server.

If a server fails at a time when it has recently sent state information or a state information update to one or more backup servers, it may be possible for one or more of the backup servers to assume the connection and the associated task. For example, if the failure occurs immediately after the sending of the state information or of the state information update, the backup server may be in possession of sufficient information to assume the connection and the associated task in the same manner as if the transfer were one that was planned in advance. If enough time has elapsed that the client 110 has sent a packet, to the losing server 180, since the last sending of the state information or of the state information update, and the losing server 180 did not acknowledge the packet, then the gaining server 190 may wait for the client 110 (or a switch or router between the client 110 and the server cluster 100) to resend the packet (as a result of not having received an acknowledgment for the packet).

Figure 2A:
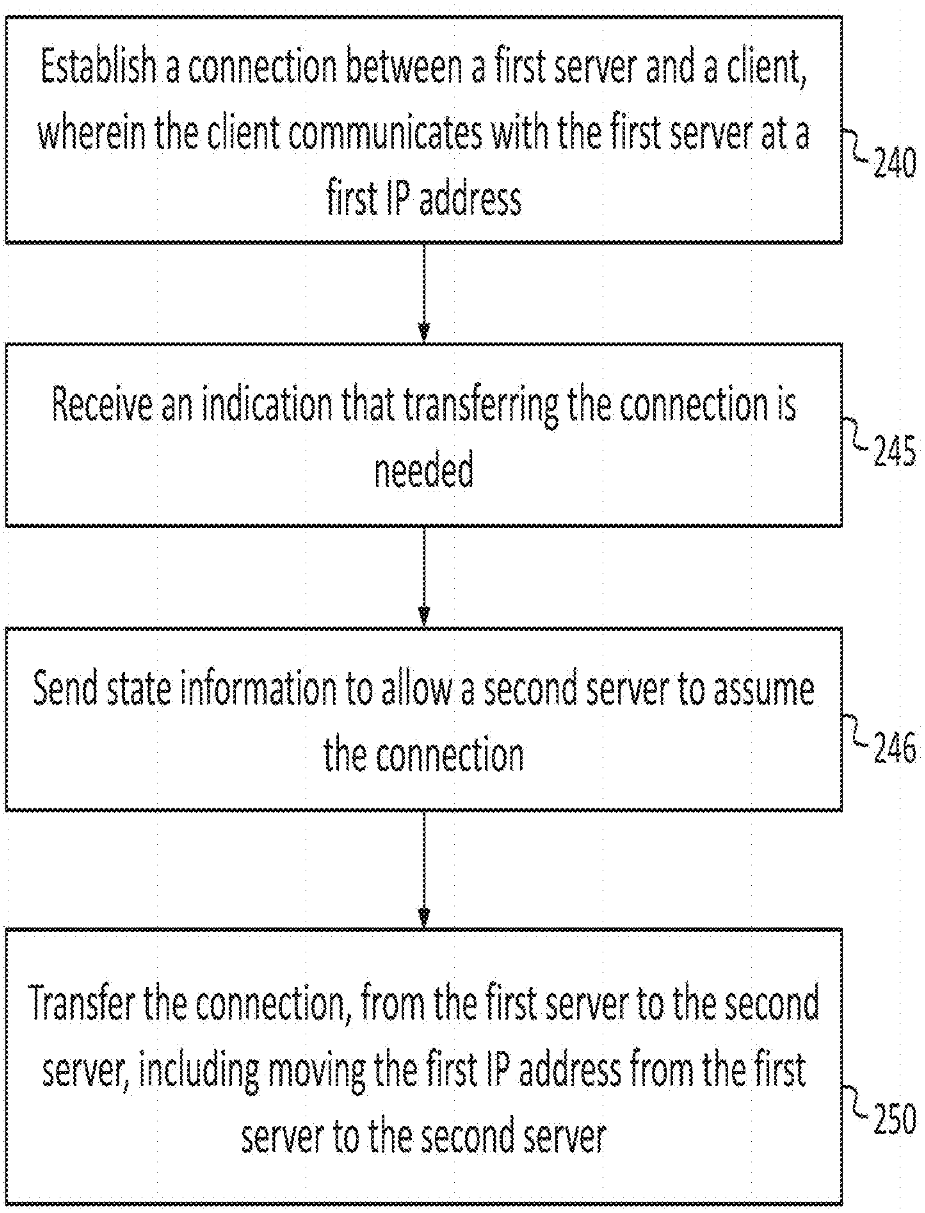
FIG. 2A is a flowchart of a method, according to an embodiment of the present disclosure.

FIG. 2A is a flowchart of a method, in some embodiments. The method includes, establishing, at 240, a connection between the first server 180 and the client 110 (wherein the client communicates with the first server 180 at a first IP address), receiving, at 245, an indication that transferring the connection is needed, sending, at 246, (either (i) before, or (ii) after (as shown in FIG. 2A), receiving, at 245, the indication that transferring the connection is needed) state information to allow a second server to assume the connection and transferring, at 250, the connection, from the first server 180 to the second server 190, including moving the first IP address from the first server 180 to the second server 190. In some examples, the state information is sent (246) prior to receiving (245) an indication that the connection needs to be transferred. For example, state information may be sent and updated periodically. In examples, this may be useful in situations where the connection needs to be transferred based on the sudden inoperability of the first server.

Figure 2B:
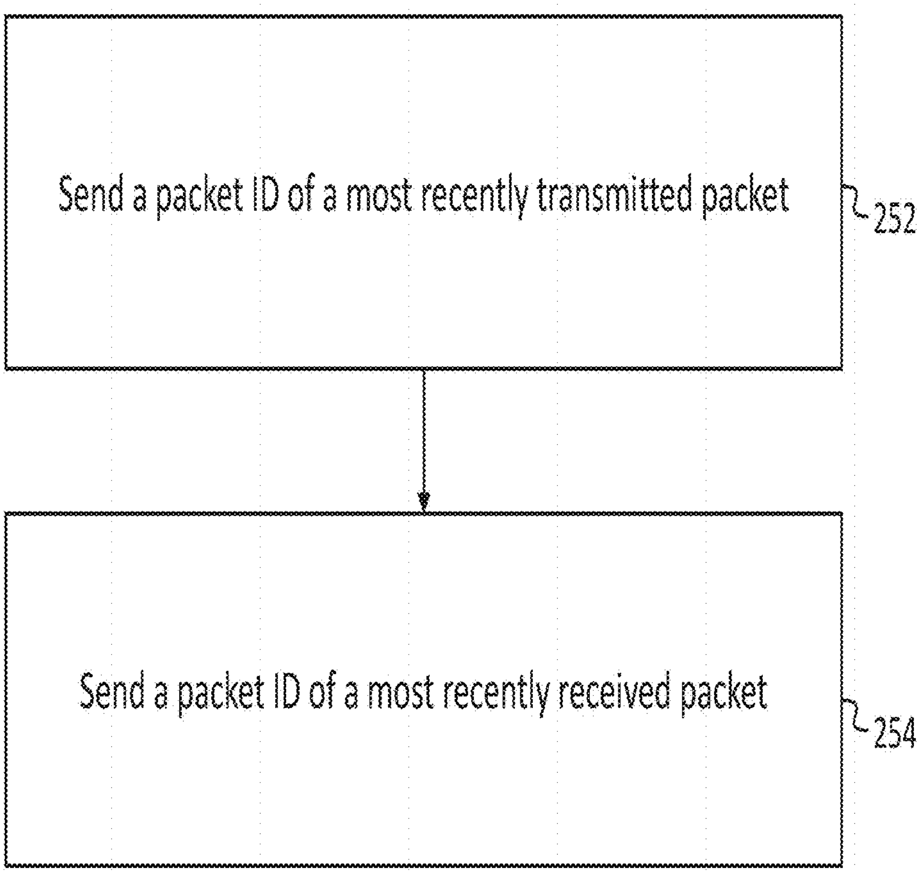
FIG. 2B is a flowchart of a method, according to an embodiment of the present disclosure.

In some embodiments, as illustrated in FIG. 2B, the state information includes a packet identifier (ID) of a most recently transmitted packet and a packet ID of a most recently received packet. In such examples, flow may proceed from the establishing of the connection, at 240 (FIG. 2A), to sending, at 252, the packet ID of a most recently transmitted packet and sending, at 254, a packet ID of a most recently received packet (these steps 252, 254 may be part of the sending, at 246, in FIG. 2A, of state information, to the second server 190).

Figure 2C:
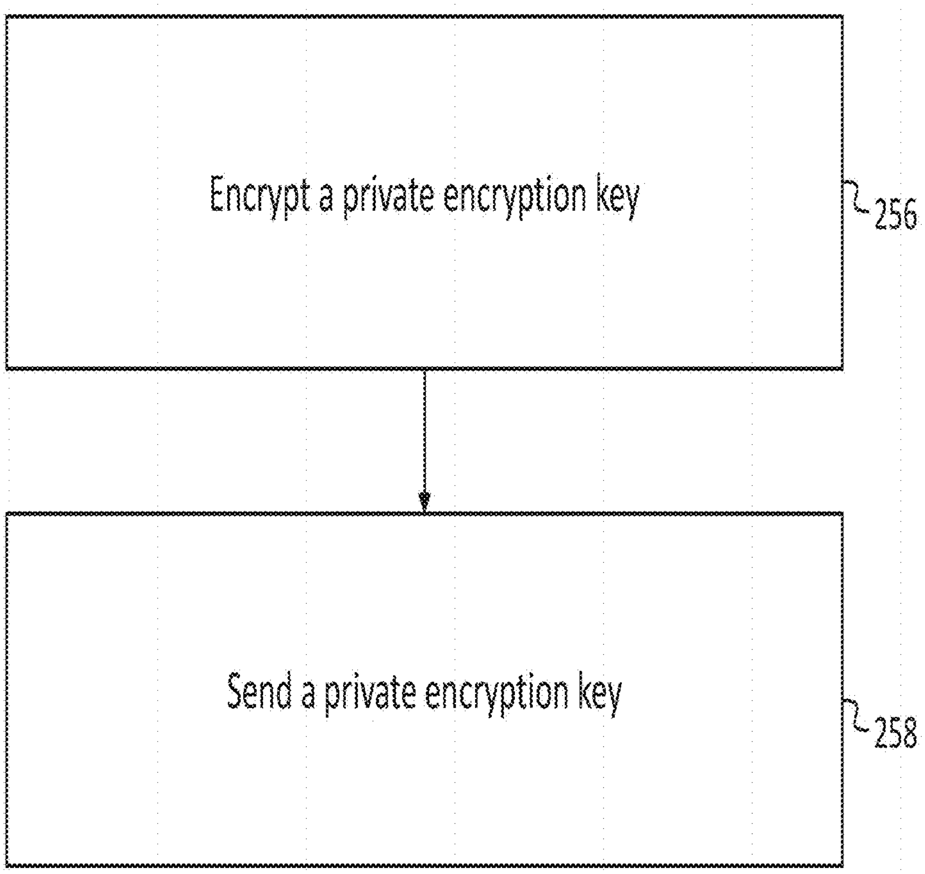
FIG. 2C is a flowchart of a method, according to an embodiment of the present disclosure.

In examples, the sending of the state information may further include sending an encrypted private encryption key, and, as illustrated in FIG. 2C, the method may include (as part of the sending, at 246 (FIG. 2A), of state information) encrypting, at 256, the private encryption key, and sending, at 258, the encrypted private encryption key, to the second server 190.

Figure 2D:
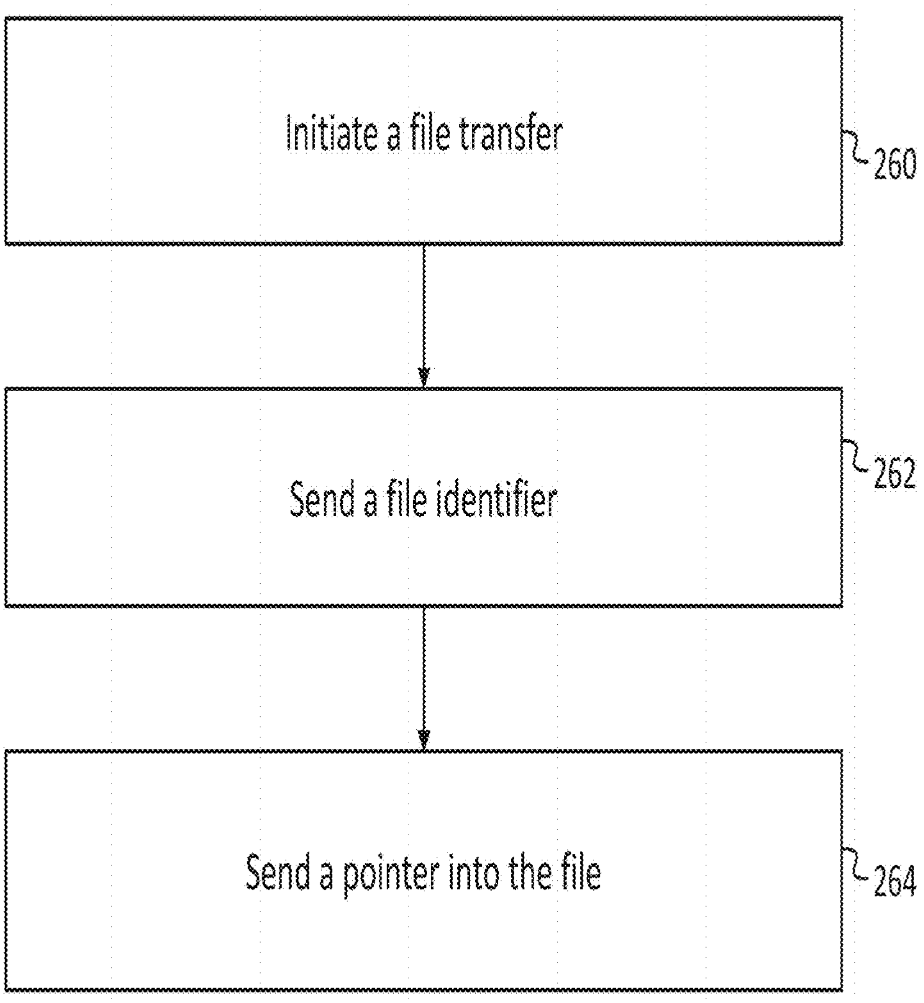
FIG. 2D is a flowchart of a method, according to an embodiment of the present disclosure.
Figure 2E:
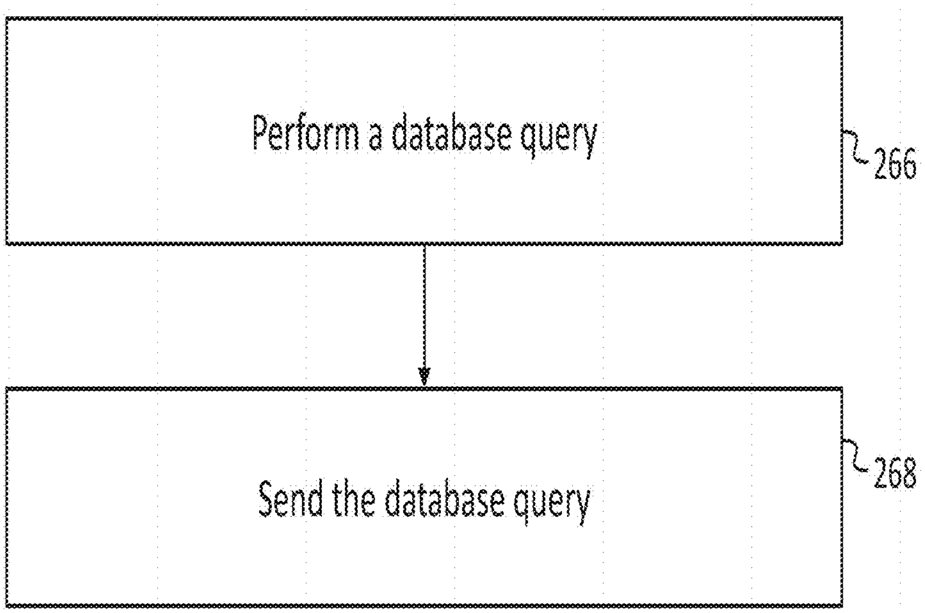
FIG. 2E is a flowchart of a method, according to an embodiment of the present disclosure.
Figure 2F:
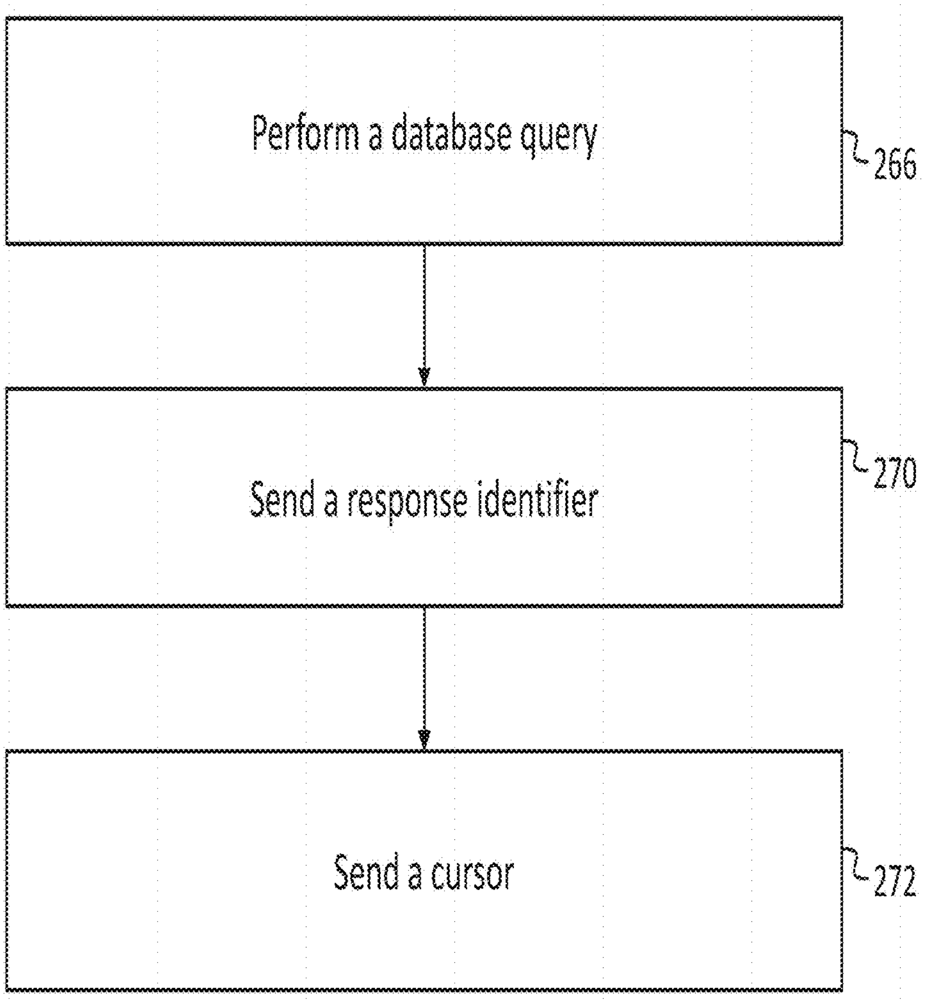
FIG. 2F is a flowchart of a method, according to an embodiment of the present disclosure.

As discussed above, the first server may perform a computing process for the client, and FIGS. 2D-2F illustrate some examples that may be involved in transferring state for the various computing processes to a second server. For example, in some embodiments, referring to FIG. 2D, the first server 180 may initiate, at 260, a file transfer to the client 110, and the method may include (as part of the sending of state information, at 246 (FIG. 2A)) sending, at 262, a file identifier, and sending, at 264, a pointer into the file, e.g., identifying the first byte of data not yet sent.

In some embodiments, referring to FIG. 2E, the first server 180 may, as mentioned above, perform, at 266, a database query, and the method may include (as part of the sending, at 246 of state information (FIG. 2A)) (i) sending, at 268, the database query, or, (ii) referring to FIG. 2F, sending, at 270, a response identifier identifying a query response, and sending, at 272, a cursor identifying a location in the query response to which processing has progressed.

Figure 2G:
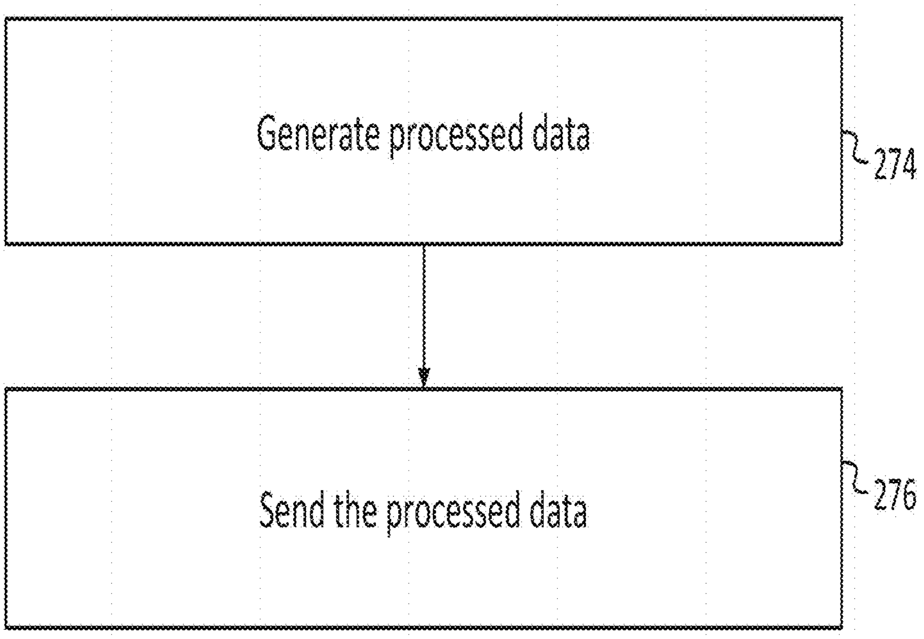
FIG. 2G is a flowchart of a method, according to an embodiment of the present disclosure.
Figure 2H:
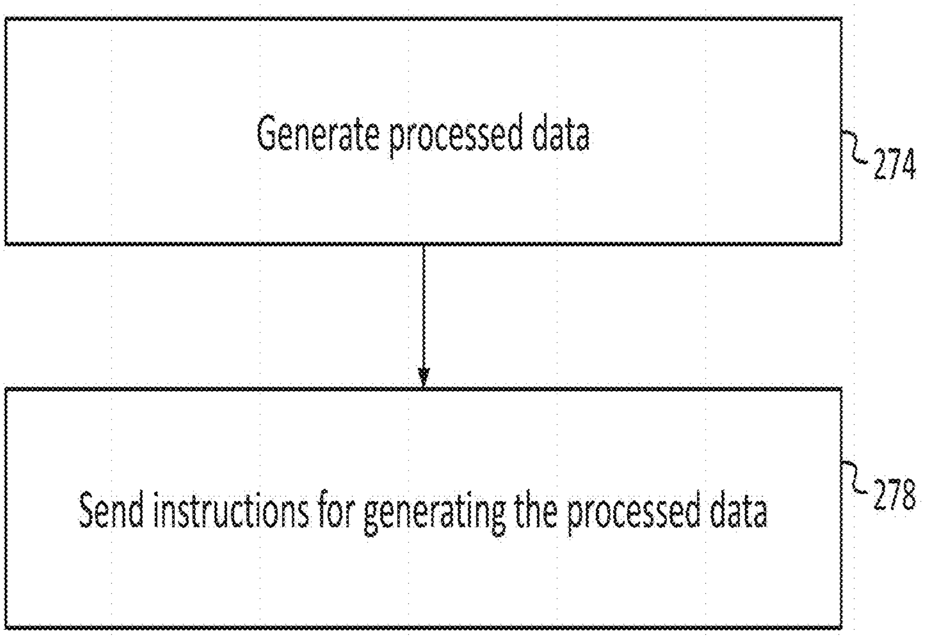
FIG. 2H is a flowchart of a method, according to an embodiment of the present disclosure.

As mentioned above, in some circumstances, the first server 180 may, as illustrated in FIG. 2G, generate, at 274, processed data, and the method may include (as part of the sending of state information, at 246 (FIG. 2A)) (i) sending, at 276, the processed data, or, as illustrated in FIG. 2H, sending, at 278, instructions for generating the processed data.

Figure 2I:
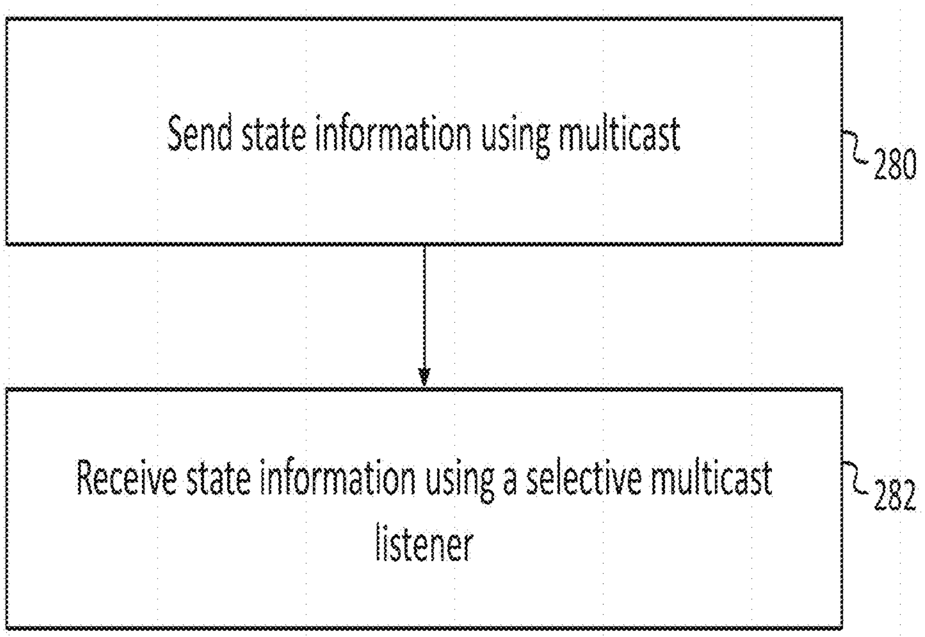
FIG. 2I is a flowchart of a method, according to an embodiment of the present disclosure.
Figure 2J:
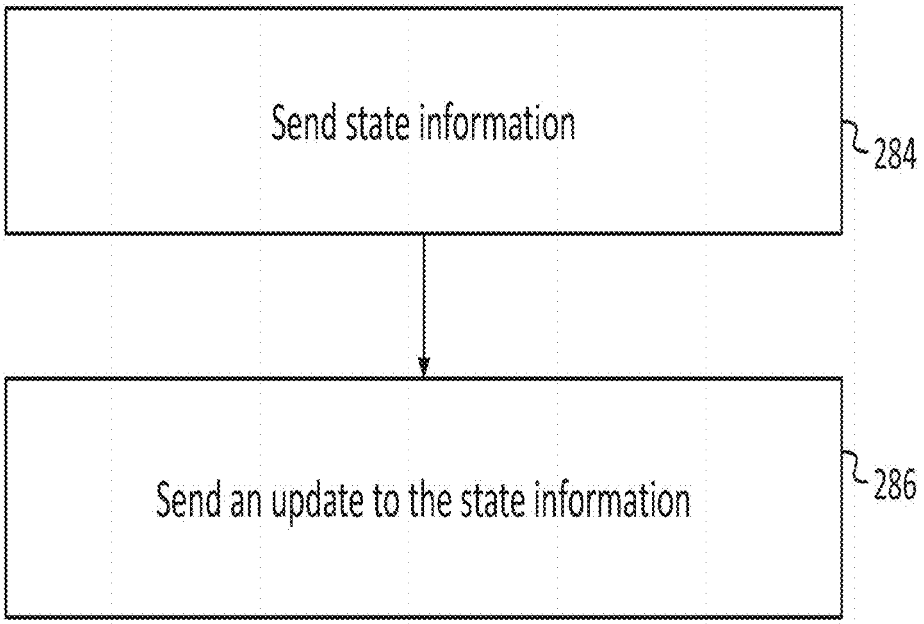
FIG. 2J is a flowchart of a method, according to an embodiment of the present disclosure.

In examples, the sending of state information, at 246 (FIG. 2A), may include, as illustrated in FIG. 2I, sending, at 280, the state information using multicast, and the receiving of the state information may include receiving, at 282, the state information using a selective multicast listener. In some embodiments the sending of state information, at 246 (FIG. 2A), may include, as illustrated in FIG. 2J, sending, at 284, a full set of state information (e.g., initially, or initially and periodically thereafter), and sending, periodically, at 286, updates to the state information.

Figure 2K:
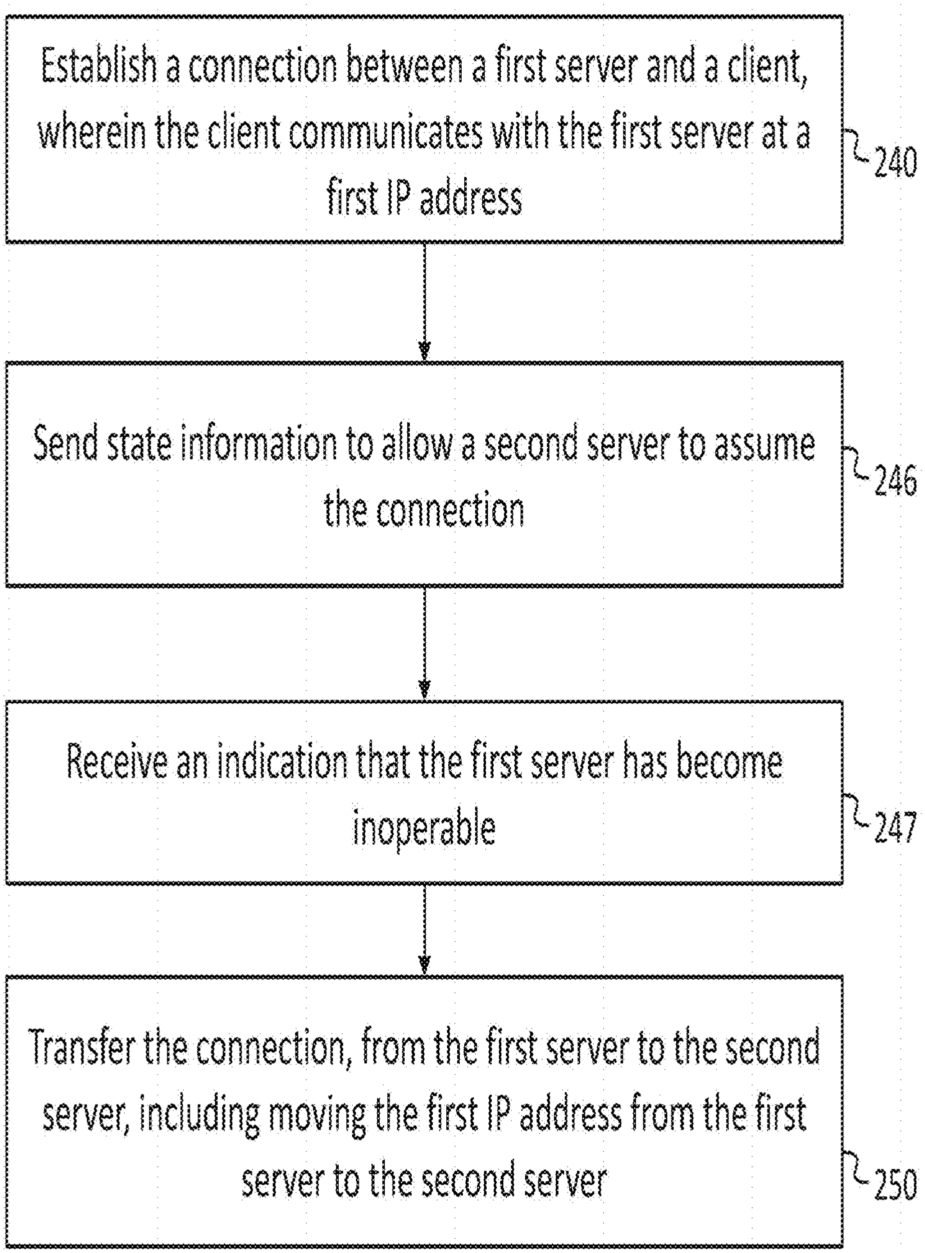
FIG. 2K is a flowchart of a method, according to an embodiment of the present disclosure.
Figure 2L:
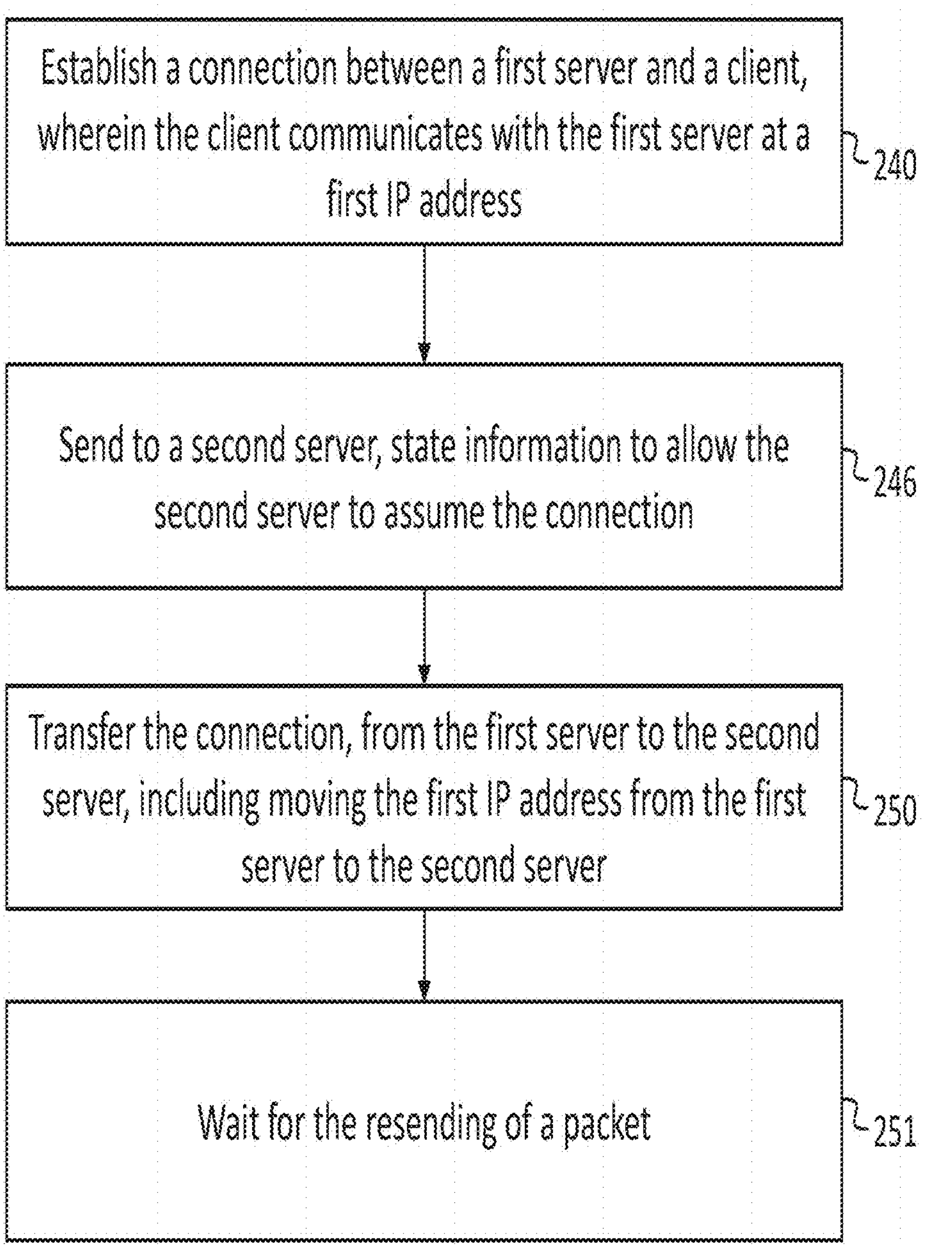
FIG. 2L is a flowchart of a method, according to an embodiment of the present disclosure.

In some embodiments, the transferring of the connection to the second server 190 makes it possible for the system to recover from the failure of a server, or load balance overburdened servers, with relatively little impact on the client 110, e.g., without a need to establish a new connection with the client 110 and without the need for the client 110 to send a new request for a service. FIG. 2K shows such a situation, with a method including, establishing, at 240, the connection between the first server 180 and the client 110 (wherein the client communicates with the first server 180 at a first IP address), sending, at 246, to the second server 190, state information to allow the second server 190 to assume the connection, receiving, at 247, an indication that the first server 180 has become inoperative, and, at 250, transferring the connection, from the first server 180 to the second server 190. In such a situation, as illustrated in FIG. 2L, if the client 110 sent a packet to the first server 180 before the failure of the first server 180, but after the sending, by the first server 180, of the most recent state information to the second server 190, the method may include waiting, at 251, by the second server 190, for the resending of the packet to the first IP address that has now been moved to the second server 190.

Figure 3:
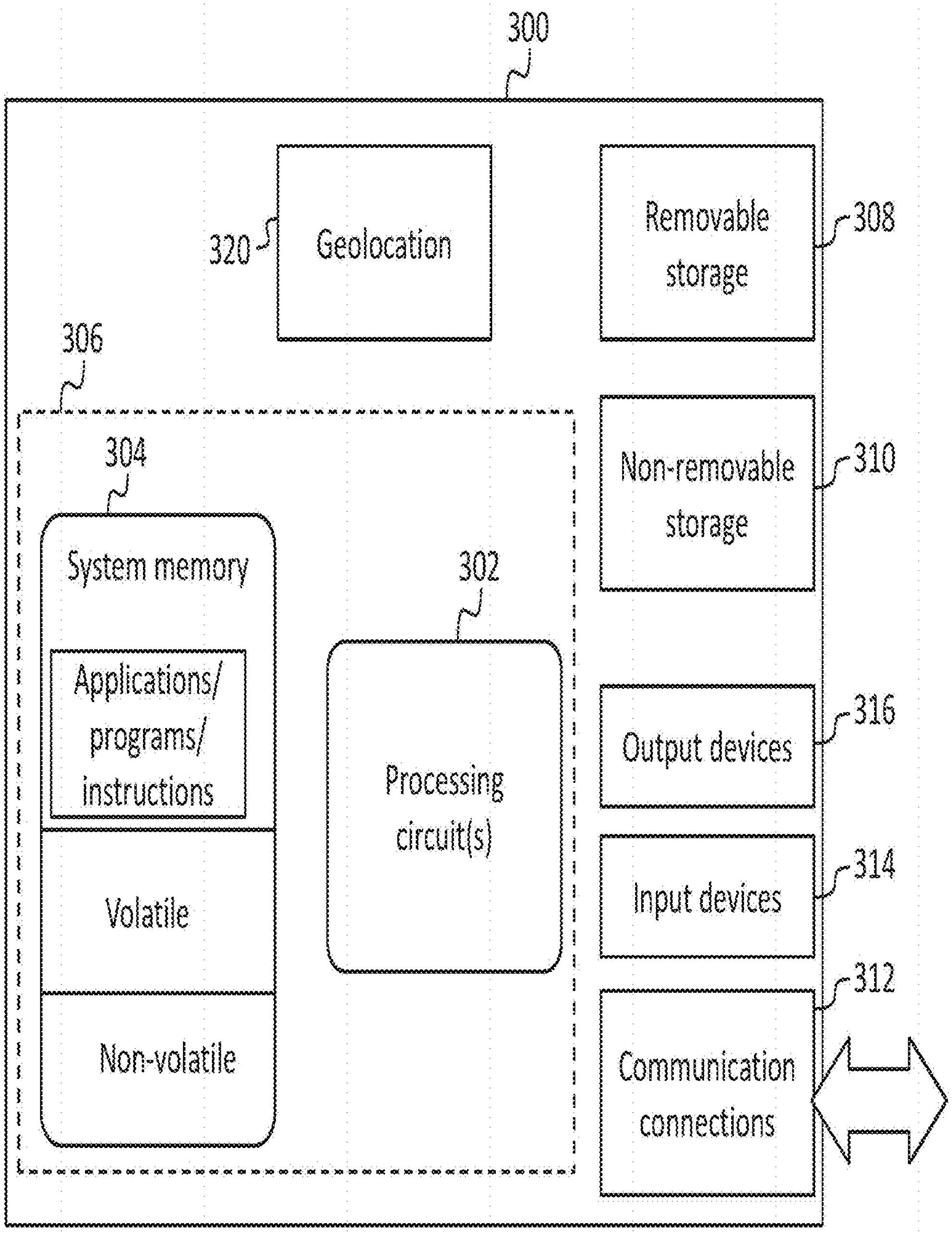
FIG. 3 is a block diagram of an operating environment, according to an embodiment of the present disclosure.

FIG. 3 depicts an example of a suitable operating environment 300 that may be used to implement any of the servers of the server cluster 100, or other computing devices within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage devices (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, the word "or" is inclusive, so that, for example, "A or B" means any one of (i) A, (ii) B, and (iii) A and B. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of a system and method for transferring a client connection from one server to another server have been specifically described and illustrated herein, many modifications and variations will be apparent to those skilled in the art. Accordingly, it is to be understood that a system and method for transferring a client connection from one server to another server constructed according to principles of this disclosure may be embodied other than as specifically described herein. The invention is also defined in the following claims, and equivalents thereof.

What is claimed is:

1. A method, comprising:

establishing a connection between a first server and a client, wherein the client communicates with the first server at a first Internet protocol (IP) address;

sending, by the first server, state information to allow a second server to assume the connection;

receiving an indication that transferring the connection is needed; and transferring the connection, from the first server to the second server, including moving the first IP address from the first server to the second server, wherein the state information is sent to the second server before receiving the indication that transferring the connection is needed.

2. The method of claim 1, wherein the state information comprises a packet identifier (ID) of a most recently transmitted packet and a packet ID of a most recently received packet.

3. The method of claim 1, wherein:

the state information comprises a private encryption key; and the sending of the private encryption key comprises:

encrypting the private encryption key, and sending the encrypted private encryption key to the second server.

4. The method of claim 1, further comprising, after establishing the connection, and before transferring the connection, initiating a file transfer from the first server to the client, wherein the state information comprises information to allow the second server to continue the file transfer after the transferring of the connection, including:

a file identifier for a file stored in storage accessible to both the first server and the second server; and a pointer into the file, identifying file data remaining to be sent.

5. The method of claim 1, further comprising, after establishing the connection, and before transferring the connection, performing, by the first server, a database query associated with the connection, wherein the state information comprises the database query.

6. The method of claim 5, wherein the state information comprises a response identifier identifying a query response stored in a database server, and a cursor identifying a location in the query response.

7. The method of claim 1, further comprising, after establishing the connection, and before transferring the connection, generating, by the first server, processed data associated with the connection, and storing the processed data in the first server, wherein the sending of the state information comprises one of sending the processed data or sending instructions for generating the processed data.

8. The method of claim 1, wherein the sending of the state information comprises sending the state information, using multicast, to a plurality of servers including the second server.

9. The method of claim 1, wherein the sending of the state information comprises:

sending, on a first occasion, state information; and sending, on a second occasion, an update to the state information, the update including state information changes having occurred between the first occasion and the second occasion.

10. The method of claim 1, further comprising receiving, prior to the transferring of the connection, an indication that the first server has become inoperable, and wherein the state information is sent to the second server prior to receiving an indication that the first server has become inoperable.

11. A system, comprising:

at least one processor; and memory storing instructions that, when executed by the at least one processor, cause the system to perform a method, the method comprising:

establishing a connection between a first server and a client, wherein the client communicates with the first server at a first Internet protocol (IP) address;

sending, by the first server, state information to allow a second server to assume the connection;

receiving an indication that transferring the connection is needed; and transferring the connection, from the first server to the second server, including moving the first IP address from the first server to the second server, wherein the state information is sent to the second server before receiving the indication that transferring the connection is needed.

12. The system of claim 11, wherein the method further comprises, after establishing the connection, and before transferring the connection, initiating a file transfer from the first server to the client, wherein the state information comprises information to allow the second server to continue the file transfer after the transferring of the connection, including:

a file identifier for a file stored in storage accessible to both the first server and the second server; and a pointer into the file, identifying file data remaining to be sent.

13. The system of claim 11, wherein the method further comprises, after establishing the connection, and before transferring the connection, generating, by the first server, processed data associated with the connection, and storing the processed data in the first server, wherein the sending of the state information comprises one of sending the processed data or sending instructions for generating the processed data.

14. The system of claim 11, wherein the sending of the state information comprises:

sending, on a first occasion, state information; and sending, on a second occasion, an update to the state information, the update including state information changes having occurred between the first occasion and the second occasion.

15. A system, comprising:

at least one processor; and memory storing instructions that, when executed by the at least one processor, cause the system to perform a method, the method comprising:

receiving, from a first server and at a second server, first state information relating to a connection between the first server and a client;

receiving, from the first server and at the second server, an update to the first state information, the update including state information changes having occurred after receiving the first state information and indicative of a computing process being performed by the first server for the client;

receiving, at the second server and after receiving the update to the first state information, an indication that the connection needs to be transferred;

receiving, by the second server, an indication that a first internet protocol (IP) address related to the connection has been transferred from the first server to the second server; and continuing, by the second server and based on the update to the first state information, the computing process via the connection to the client.

16. The system of claim 15, wherein the computing process comprises one of a file transfer or a database query.

* * * * *